(12) United States Patent
Pulikonda et al.

(10) Patent No.: US 11,781,364 B2
(45) Date of Patent: Oct. 10, 2023

(54) AUTOMATIC CONTROL OF A POWER TAILGATE UNDER EXTERNAL LOADING

(71) Applicant: Aisin Technical Center of America, Inc., Northville, MI (US)

(72) Inventors: Gowtham Harsha Pulikonda, New Hudson, MI (US); Yasuyuki Noiri, Walled Lake, MI (US); Nicholas Ozog, South Lyon, MI (US); Ryan Heins, Wixom, MI (US)

(73) Assignee: Aisin Technical Center of America, Inc., Northville, MI (US)

(*) Notice: Subject to any disclaimer, the term of this patent is extended or adjusted under 35 U.S.C. 154(b) by 315 days.

(21) Appl. No.: 17/217,550

(22) Filed: Mar. 30, 2021

(65) Prior Publication Data

US 2022/0316259 A1    Oct. 6, 2022

(51) Int. Cl.
| | | |
|---|---|---|
| *B62D 33/03* | (2006.01) | |
| *B62D 33/027* | (2006.01) | |
| *E05F 15/41* | (2015.01) | |
| *H02P 3/12* | (2006.01) | |
| *H02H 7/085* | (2006.01) | |

(52) U.S. Cl.
CPC .......... *E05F 15/41* (2015.01); *B62D 33/0273* (2013.01); *H02H 7/0851* (2013.01); *H02P 3/12* (2013.01); *B62D 33/03* (2013.01); *E05Y 2201/246* (2013.01); *E05Y 2201/438* (2013.01); *E05Y 2201/702* (2013.01); *E05Y 2400/36* (2013.01); *E05Y 2400/44* (2013.01); *E05Y 2400/85* (2013.01); *E05Y 2900/546* (2013.01)

(58) Field of Classification Search
CPC ..... B62D 33/0273; B62D 33/03; E05F 15/41; H02H 7/0851; H02H 7/0853; H02H 7/0854; H02H 7/093; H02P 3/22; E05Y 2201/246; E05Y 2201/439; E05Y 2201/702; E05Y 2400/36; E05Y 2400/44; E05Y 2400/85; E05Y 2400/532; E05Y 2400/56; E05Y 2400/54; E05Y 2400/546; E05Y 2900/546
See application file for complete search history.

(56) References Cited

U.S. PATENT DOCUMENTS 10,480,237 B2    11/2019   Battlogg et al.
10,611,309 B1 *   4/2020   Nagase .................... B60R 3/02
(Continued)

OTHER PUBLICATIONS

U.S. Appl. No. 16/883,246, titled "Hinge Assembly for a Power Tailgate System", filed May 26, 2020.

*Primary Examiner* — Gregory A Blankenship
(74) *Attorney, Agent, or Firm* — Christopher G. Darrow; Darrow Mustafa PC

(57) ABSTRACT

Embodiments of a system for controlling a vehicle power tailgate are described. The system includes a motor operably connectible to a tailgate to open and close the tailgate, a processor, and a memory communicably coupled to the processor. The memory stores a tailgate control module including instructions that when executed by the processor cause the processor to, responsive to a value of a motor speed parameter being above a predetermined motor speed threshold and a value of a motor acceleration parameter being above a predetermined motor acceleration threshold during opening of a tailgate, control operation of the motor to apply a braking force to the tailgate.

19 Claims, 7 Drawing Sheets

(56) References Cited

U.S. PATENT DOCUMENTS

| | | | | |
|---|---|---|---|---|
| 2001/0042989 | A1* | 11/2001 | Greif | E05F 15/40 |
| | | | | 296/50 |
| 2007/0132264 | A1* | 6/2007 | Koneval | B62D 33/0273 |
| | | | | 296/57.1 |
| 2009/0222174 | A1* | 9/2009 | Frommer | E05F 15/77 |
| | | | | 296/146.4 |
| 2013/0038081 | A1* | 2/2013 | Kerr, III | E05F 5/00 |
| | | | | 296/57.1 |
| 2013/0060403 | A1* | 3/2013 | Kerr | E05F 15/627 |
| | | | | 701/2 |
| 2015/0207437 | A1* | 7/2015 | Nagler | H02P 3/14 |
| | | | | 318/139 |
| 2018/0119474 | A1* | 5/2018 | Singh | B62D 33/03 |
| 2018/0229779 | A1* | 8/2018 | Jergess | B62D 33/0273 |
| 2019/0323281 | A1 | 10/2019 | Ghannam et al. | |
| 2020/0141171 | A1* | 5/2020 | Ghannam | B60Q 1/50 |
| 2020/0148282 | A1* | 5/2020 | Robinson | B62D 33/0273 |
| 2020/0148283 | A1* | 5/2020 | Robinson | B62D 33/03 |
| 2020/0378170 | A1* | 12/2020 | Kerr | B60J 5/102 |
| 2021/0301577 | A1* | 9/2021 | Nagase | E05F 15/611 |
| 2021/0354537 | A1* | 11/2021 | Kneifl | B60J 7/1204 |
| 2022/0056741 | A1* | 2/2022 | Williams | E05F 15/43 |
| 2022/0228634 | A1* | 7/2022 | Reif | F16D 55/226 |
| 2022/0243521 | A1* | 8/2022 | Herman | E05F 15/622 |
| 2022/0297771 | A1* | 9/2022 | Ozog | H02P 3/12 |
| 2022/0316259 | A1* | 10/2022 | Pulikonda | H02H 7/0851 |
| 2022/0381067 | A1* | 12/2022 | Noiri | E05B 81/04 |
| 2022/0381071 | A1* | 12/2022 | Heins | E05B 85/243 |

\* cited by examiner

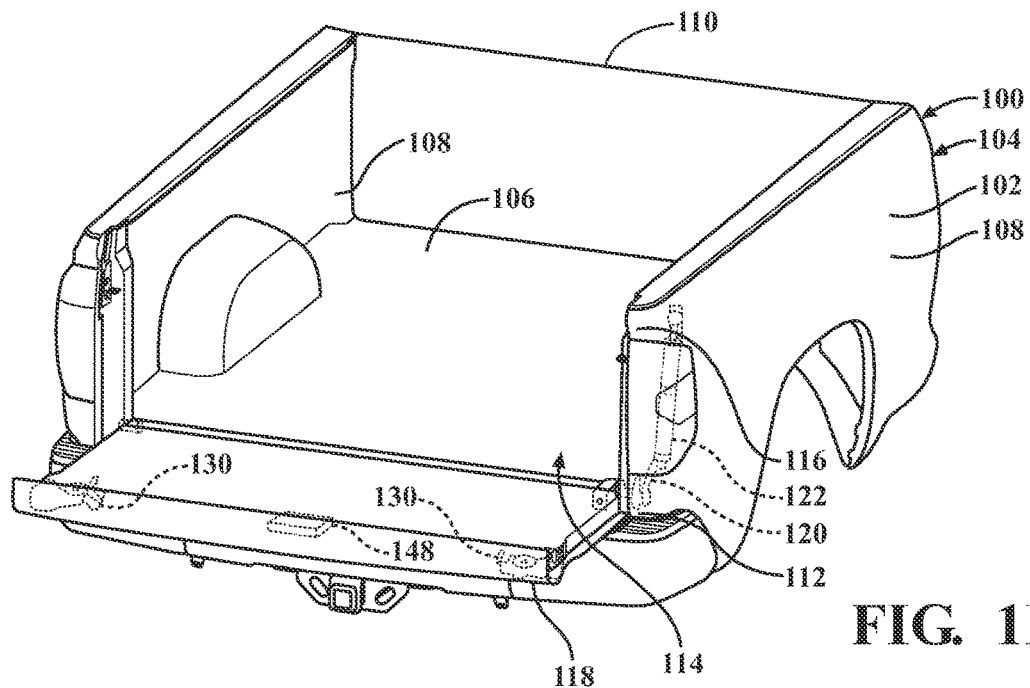
FIG. 1B
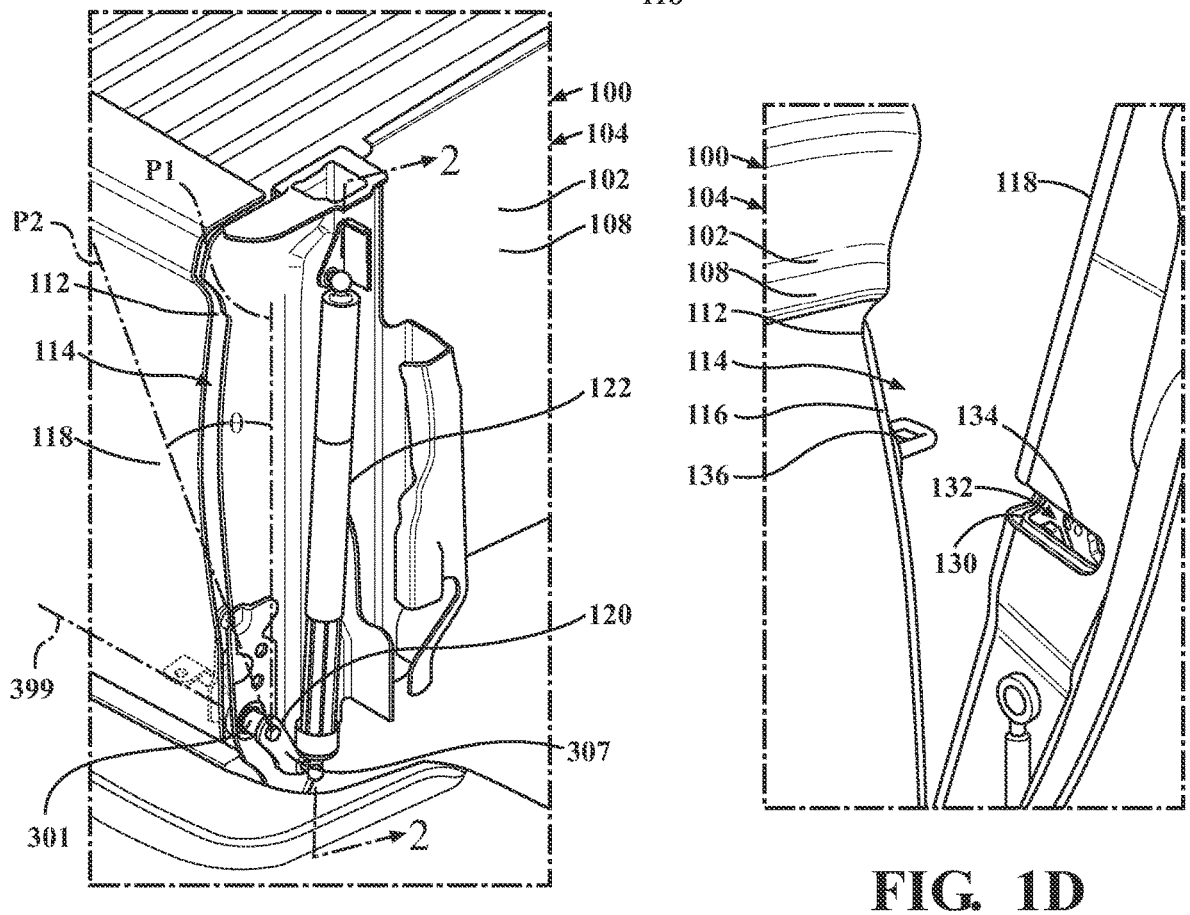
FIG. 1C
FIG. 1D

AUTOMATIC CONTROL OF A POWER TAILGATE UNDER EXTERNAL LOADING

TECHNICAL FIELD

The embodiments disclosed herein relate to vehicles with tailgates and, more particularly, to tailgate control systems for automatically opening the tailgates and automatically closing the tailgates.

BACKGROUND

Many vehicles include tailgates. The tailgate is rotatably connected to the vehicle and is movable between closed positions and open positions to serve as a closure panel for a rear portion of the vehicle. Many of today's vehicles have power tailgates included as part of power tailgate systems. The power tailgate system includes motor-driven tailgate actuators for the tailgates, and motor-driven latch actuators for the latch assemblies. By the operation of the tailgate actuators and the latch actuators, the power tailgate system automatically opens the tailgate and automatically closes the tailgate. Tailgate opening commands to the power tailgate system may be initiated by a user using a switch inside the vehicle or a keyfob.

During use, a power tailgate mounted on a vehicle such as a pickup truck may be subjected to loading for which the tailgate was not designed. For example, portions of cargo items may exert forces on an inner wall or on a top surface of a closed tailgate. If a load of sufficient magnitude continues to act on the tailgate after tailgate opening is initiated, it may cause the tailgate opening speed to increase to the point where the power tailgate and/or other elements of the power tailgate system become damaged during opening. Furthermore, a user operating the tailgate may not be located where he can see the cargo bed or tailgate. Thus, he may initiate an opening command without seeing that a load is acting on the closed tailgate and without being able to estimate the magnitude of the load.

SUMMARY

In one aspect of the embodiments described herein, a system for controlling a vehicle power tailgate is provided. The system includes a motor operably connectible to a tailgate to open and close the tailgate, a processor, and a memory communicably coupled to the processor. The memory stores a tailgate control module including instructions that when executed by the processor cause the processor to, responsive to a value of a motor speed parameter being above a predetermined motor speed threshold and a value of a motor acceleration parameter being above a predetermined motor acceleration threshold during opening of a tailgate, control operation of the motor to apply a braking force to the tailgate.

In another aspect of the embodiments described herein, a method is provided for controlling a vehicle power tailgate system including a motor operably connectible to a tailgate to open and close the tailgate. The method includes a step of, responsive to a value of a motor speed parameter being above a predetermined motor speed threshold and a value of a motor acceleration parameter being above a predetermined motor acceleration threshold during opening of a tailgate, controlling operation of the motor to apply a braking force to the tailgate.

In another aspect of the embodiments described herein, a non-transitory computer-readable medium is provided for controlling operation of a vehicle power tailgate system including a motor operably connectible to a tailgate to open and close the tailgate. The medium stores instructions that when executed by one or more processors cause the one or more processors to, responsive to a value of a motor speed parameter being above a predetermined motor speed threshold and a value of a motor acceleration parameter being above a predetermined motor acceleration threshold during opening of a tailgate, control operation of the motor to apply a braking force to the tailgate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1B is a rear perspective view of a vehicle including a truck bed having a tailgate shown in an open position, and incorporating a power tailgate system in accordance with an embodiment described herein.

FIG. 1C is a perspective view of a portion of the vehicle of FIG. 1B, showing an actuator, crank, and rotatable element of the power tailgate system mounted in the vehicle.

FIG. 1D is a perspective view of a portion of a tailgate and a wall defining the truck bed, showing a tailgate-side latch assembly including a latch for latching the tailgate and a vehicle-side striker for the latch.

DETAILED DESCRIPTION

A vehicle includes a power tailgate system with a power tailgate and one or more motor-driven tailgate actuators configured to automatically open and close the tailgate responsive to commands initiated by a user. Control per the user commands is implemented by a tailgate control module. The control module may be configured to control automatic operation of the tailgate when an external load is applied to the tailgate when the tailgate is closed. More specifically, the tailgate control module may, responsive to a tailgate opening command, implement an "unsupervised mode" of automatic tailgate control whereby the tailgate may be opened or remain closed depending on the magnitude of the external load, and in cases where a user initiating the opening command may not be located in a position to visually inspect the tailgate prior to opening. If the tailgate is automatically opened under the external load, the opening speed may be monitored during opening. If the opening speed becomes excessive, the control module may control operation of the tailgate actuator to apply braking forces to slow the descent of the tailgate and prevent damage to the power tailgate system.

Figure 1A:
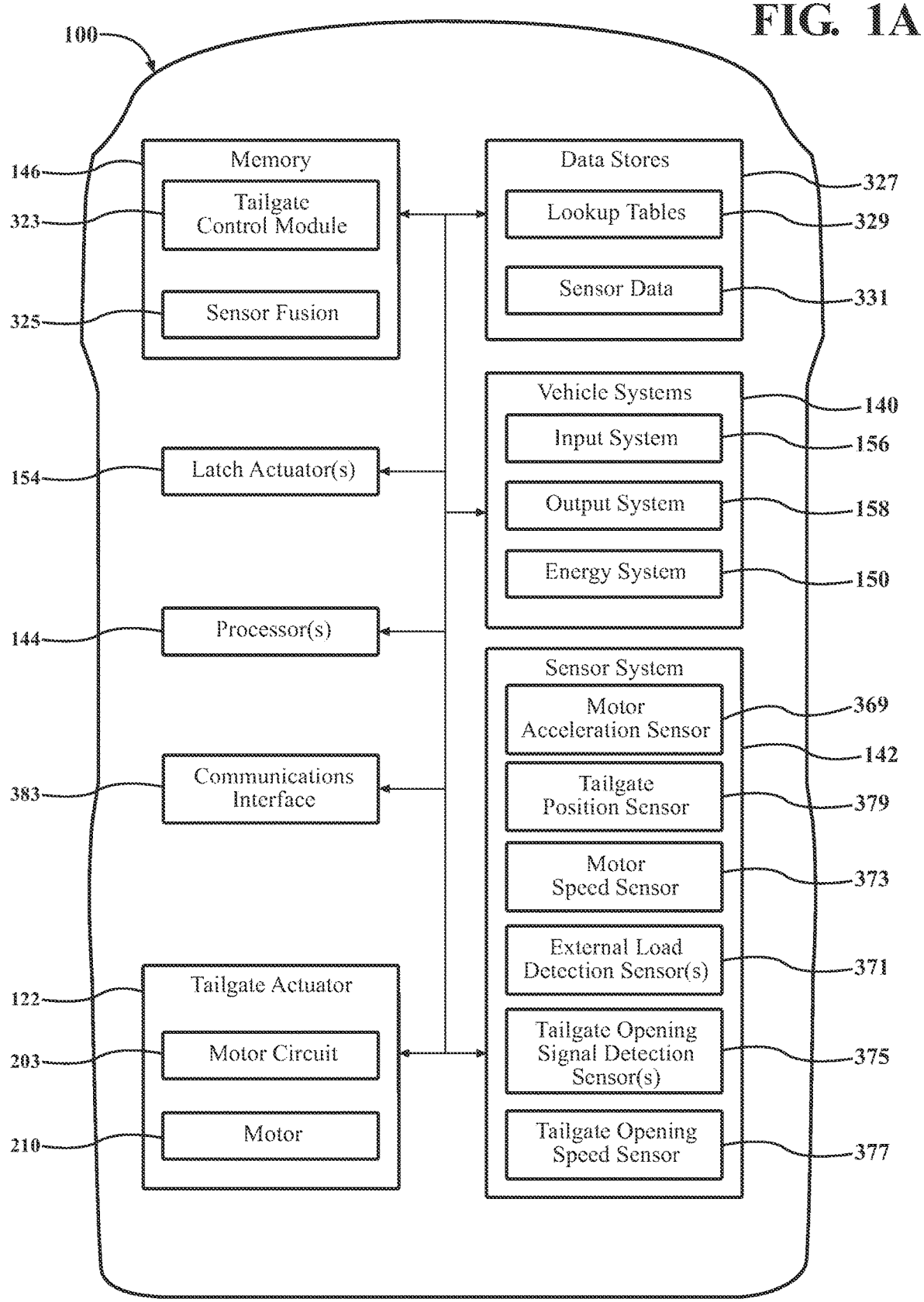
FIG. 1A is a block diagram showing elements of a vehicle incorporating a power tailgate system, including a powered tailgate, a motor, and a tailgate control module used for controlling operation of the tailgate.

Referring to FIG. 1A, an example of a vehicle 100 is illustrated. In one or more implementations, the vehicle 100 is pickup truck with a rear tailgate that may be automatically lowered (i.e., "opened") and raised (i.e., "closed"). The terms "open", "opened", "opening", etc. and "lower", "lowered", "lowering", etc. may be used interchangeably herein as applied to the tailgate. Similarly, the terms "close", "closed", "closing", etc. and "raise", "raised", "raising", etc. may be used interchangeably herein as applied to the tailgate. The vehicle 100 includes various elements. It will be understood that in various embodiments it may not be necessary for the vehicle 100 to have all of the elements shown in FIG. 1A. The vehicle 100 can have any combination of the various elements shown in FIG. 1A. Further, the vehicle 100 can have additional elements to those shown in FIG. 1A. In some arrangements, the vehicle 100 may be implemented without one or more of the elements shown in FIG. 1A. While the various elements are shown as being located within the vehicle 100 in FIG. 1A, it will be understood that one or more of these elements can be located external to the vehicle 100.

Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Part of the exemplary passenger vehicle 100 is shown in FIG. 1B. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a transmission and the like, as well as other powertrain components (such as wheels, for example) housed in the engine compartment and elsewhere in the vehicle 100. The wheels support the remainder of the vehicle 100 on the ground. One, some or all of the wheels may be powered by the remainder of the powertrain components to drive the vehicle 100 along the ground.

The vehicle 100 may include a body 104 that forms the exterior and defines or otherwise encloses the bed 102 and the other compartments. In relation to the bed 102, the body 104 includes a deck or cargo bed 106, two sides 108, a bulkhead 110 and a rear end 112. At the rear end 112, the body 104 defines a tailgate opening 114. Likewise, the body 104, including but limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114.

As shown with reference to FIGS. 1B and 1C, the tailgate 118 serves as closure panel for the bed 102. The tailgate 118 is pivotally connected to the surrounding body 116 for movement, relative to the tailgate opening 114, between a closed (or "up") position and an open (or "down") position through a range of partially-open positions. In FIG. 1C, the tailgate 118 is shown in the closed position. In the closed position, the tailgate 118 is positioned over the tailgate opening 114, with the periphery of the tailgate 118 adjacent to the surrounding body 116, and the tailgate 118 in alignment with the surrounding body 116. In FIG. 1B, the tailgate 118 is shown in the open position. In the open position, the tailgate 118 is positioned away from the tailgate opening 114, which allows access to the bed 102 from the rear of the vehicle 100. In FIG. 1D, the tailgate 118 is shown in a representative partially-open position. In the partially-open positions, the tailgate 118 is between the closed position and the open position.

As shown with particular reference to FIGS. 1B and 1C, in relation to opening the tailgate 118 and closing the tailgate 118, the vehicle 100 includes a hinge assembly 120, and an in-bed tailgate actuator 122. Serving, at least in part, as a basic hinge, the hinge assembly 120 runs between the bed 102 and the tailgate 118. The hinge assembly 120 connects the tailgate 118 to the bed 102, and supports the tailgate 118 from the bed 102 for rotational movement between the closed position and the open position. The tailgate actuator 122 corresponds to the hinge assembly 120 and may be housed, in whole or in part, in the bed 102. From inside the bed 102, the tailgate actuator 122 is connected with the tailgate 118 through the hinge assembly 120. Although the vehicle 100, as shown, includes one hinge assembly 120, and one tailgate actuator 122, it will be understood that this disclosure is applicable in principle to otherwise similar vehicles including one or more hinge assemblies 120, and one or more tailgate actuators 122.

Referring to FIG. 1C, in one or more arrangements, the hinge assembly 120 may include a rotatable element 301 structured for transmitting rotational force to the tailgate. In one or more arrangements, the rotatable element may be rotary through-bed torque shaft incorporated into the hinge assembly 120 for operable connection with the tailgate. In other arrangements, the rotatable element may be another rotatable portion of the hinge assembly structured for operable connection with the tailgate, depending on the particular hinge assembly design. The rotatable element 301 may be axially aligned with the pivotal movement of the tailgate 118, and supported from the bed 102 for axial rotation. The rotatable element 301 may support the tailgate 118 for rotation about an associated rotatable element rotational axis 399. Moreover, the hinge assembly 120 may also include a pivotal in-bed crank 307 operably connected to the rotatable element 301 along the rotational axis 399 of the rotatable element 301 so that a rotation of the crank 307 produces a corresponding rotation of the rotatable element 301 about the axis 399 (i.e., rotating the crank 307 15° about the rotatable element rotational axis 399 produces a corresponding rotation of the rotatable element 301 15° about the axis). From outside the bed 102, the rotatable element 301 may be connected to and support the tailgate 118 from the bed 102. From inside the bed 102, the tailgate actuator 122 is connected between the bed 102 and the crank 307. Moreover, the bed 102, the tailgate actuator 122 and the crank 307 serially share pivotal connections. The rotatable element 301 may transmit torque and rotation associated with the pivotal movement of the tailgate 118 between the tailgate and the crank 307. The term "operably connected," as used throughout this description, can include direct or indirect connections, including connections without direct physical contact. Similarly, elements described as being "operably connectible" are elements that can be connected directly (through direct physical contact) or indirectly, through other, physically intermediate element(s).

With the bed 102, the tailgate actuator 122 and the crank 307 serially sharing pivotal connections, from between the bed 102 and the crank 307, as the product of extending and retracting as described herein, the tailgate actuator 122 is operable to pivot the crank 307 against the bed 102. With the tailgate 118, the rotatable element 301 and the crank 307 serially sharing rotary connections, as the crank 307 pivots, the rotatable element 301 axially rotates, and, as the rotatable element 301 axially rotates, the tailgate 118 pivotally closes, pivotally opens, and otherwise pivotally moves between the open position and the closed position.

In one or more arrangements, the hinge assembly may be structured as described in pending commonly-owned U.S. patent application Ser. No. 16/883,246, the disclosure of which is incorporated by reference herein in its entirety.

The vehicle 100 may include a tailgate actuator 122. The tailgate actuator 122 may be connected to the energy system 150 as described herein. Moreover, the tailgate actuator 122 may be connected with the tailgate 118 through the hinge assembly 120 and its rotatable element 301. Through the hinge assembly 120, the tailgate actuator 122 may be operable to open the tailgate 118, close the tailgate 118 and otherwise move the tailgate 118 between the closed position and the open position using electrical energy from the energy system 150. Although the vehicle 100, as shown, includes one tailgate actuator 122, it will be understood that this disclosure is applicable in principle to otherwise similar vehicles including one or more tailgate actuators 122.

Figure 2:
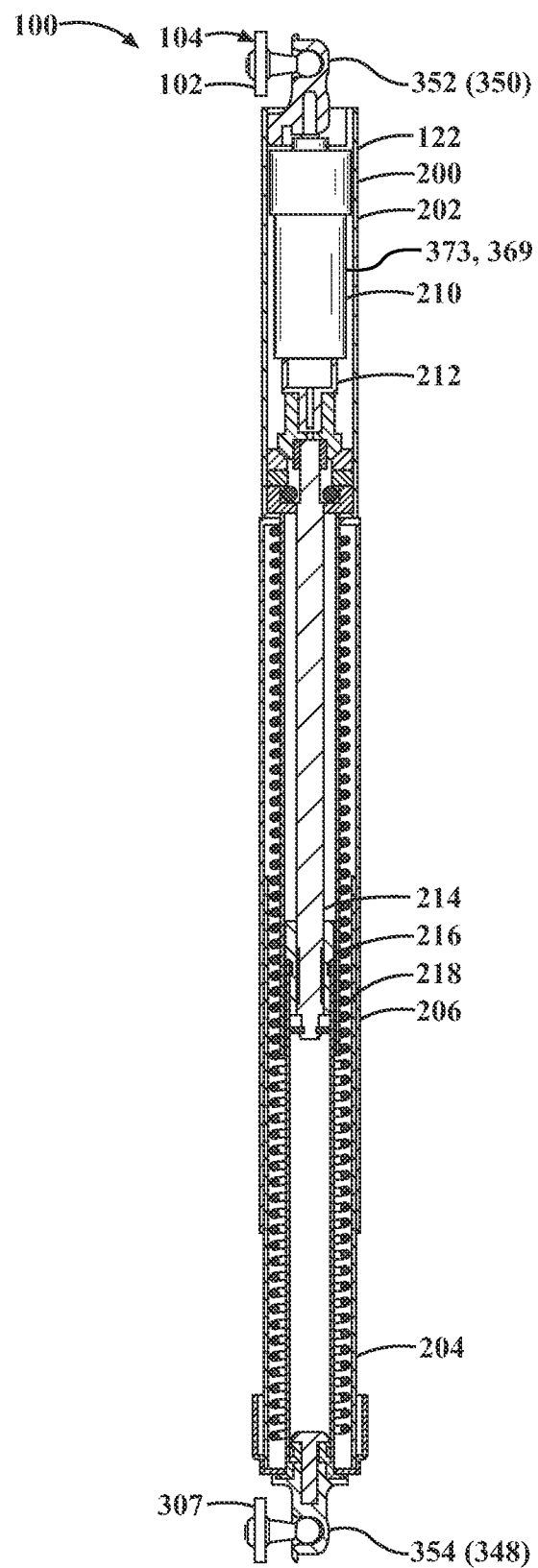
FIG. 2 portrays the tailgate actuator using a cross-sectional view taken along the line 2-2 in FIG. 1C, showing the motor included as part of the tailgate actuator in an implementation in which the tailgate actuator is a motor-driven spindle drive.

As shown with particular reference to FIG. 2, in one implementation, the tailgate actuator 122 may be a motor-driven spindle drive. The tailgate actuator 122 may include a two-piece telescoping or otherwise extensible housing 200. The housing 200 may include a tubular base 202, a tubular slide 204, and a sliding overlap 206 therebetween. Inside the housing 200, the tailgate actuator 122 may include axially aligned items for converting rotary movement into linear extension and retraction. In particular, the tailgate actuator 122 may include a fixed motor 210, a fixed reduction drive 212, a rotary screw 214, a fixed nut 216, and a spring 218. The motor 210 and the reduction drive 212 may be secured with the base 202, the nut 216 may be secured with the slide 204, and the screw 214 may run through the nut 216. The base 202 and the nut 216 may support the screw 214 for axial rotation, including powered axial rotation by the motor 210 through the reduction drive 212. In one implementation, the reduction drive 212 may be a planetary reduction drive. For instance, the reduction drive 212 may be a multistage planetary reduction drive. In one implementation, the screw 214 may be a ball screw, and the nut 216 may be a ball nut.

The motor 210 may be operable to drive the tailgate actuator 122 to extend and retract. In particular, the motor 210 may be operable to spin, and thereby power the axial rotation of the screw 214 through the reduction drive 212. As the screw 214 axially rotates, the nut 216 axially moves along the screw 214 and, as the nut 216 axially moves along the screw 214, the base 202 and the slide 204 are alternately drawn apart and drawn together. As the base 202 and the slide 204 are drawn apart, the tailgate actuator 122 is extended. Alternately, as the base 202 and the slide 204 are drawn together, the tailgate actuator 122 is retracted.

From inside the bed 102, the tailgate actuator 122 is configured to reach between the bed 102 and the crank 307. As the product of extending and retracting, the tailgate actuator 122 is operable to pivot the crank 307 against the bed 102. Likewise, to allow the tailgate actuator 122 to extend and retract in association with pivoting the crank 307 against the bed 102, the bed 102, the tailgate actuator 122 and the crank 307 serially share pivotal connections. Accordingly, the bed 102 and the tailgate actuator 122 are configured to make a pivotal connection with one another. In particular, the bed 102 may include a bracket-mounted ball stud 350, the tailgate actuator 122 includes a ball socket 352, and the ball stud 350 and the ball socket 352 are configured to make a ball-and-socket connection with one another. Moreover, the crank 307 and the tailgate actuator 122 are configured to make a pivotal connection with one another. In particular, the crank 307 includes the ball stud 348, the tailgate actuator 122 includes a ball socket 354, and the ball stud 348 and the ball socket 354 are configured to make a ball-and-socket connection with one another.

In one or more arrangements, the actuator 122 may be structured as described in previously referenced U.S. patent application Ser. No. 16/883,246.

Moreover, as shown with particular reference to FIG. 1D, the vehicle 100 may include one or more tailgate-side latch assemblies 130. Each latch assembly 130 may include a striker chute 132 and a corresponding latch 134 for latching the tailgate 118. Relatedly, the vehicle 100 may include one or more vehicle-side strikers 136 corresponding to the striker chutes 132 and the latches 134. Each latch assembly 130 is connected to the tailgate 118. Each latch assembly 130 may be housed, in whole or in part, in the tailgate 118. For instance, each latch assembly 130 may be housed in the tailgate 118, and connected to the tailgate 118, as a unitary module. Each striker 136 is connected to the surrounding body 116. Although the vehicle 100, as shown, includes two latch assemblies 130 and two strikers 136, it will be understood that this disclosure is applicable in principle to otherwise similar vehicles including one or more latch assemblies 130 and one or more strikers 136.

For each corresponding striker chute 132, latch 134 and striker 136, the striker chute 132 opens to the tailgate 118 for passing the striker 136 into and out of the tailgate 118. The latch 134 is movable, relative to the striker chute 132, in a latching direction and in an unlatching direction between an unlatching position and a latching position. In FIG. 1D, the latch 134 is shown in the unlatching position. In the unlatching position, the latch 134 aligns with the striker chute 132 for passing the striker 136 into and out of the tailgate 118. In the latching position, the latch 134 crosses the striker chute 132 for capturing the striker 136 within the tailgate 118. Accordingly, the latch 134 latches the tailgate 118 to the surrounding body 116 against the striker 136.

The latch 134 may be activated for non-revertible movement in the latching direction. When the tailgate 118 is being closed, the latch 134 functions as the tailgate 118 is moved to the closed position, and afterward, when the tailgate 118 is in the closed position. With the tailgate 118 in the open position, the latch 134, having previously unlatched the tailgate 118, is in the unlatching position. To close the tailgate 118, the latch 134 is activated for non-revertible movement in the latching direction. As the tailgate 118 is moved to the closed position, the striker 136 passes into the tailgate 118 through the striker chute 132. As it passes into the tailgate 118, the striker 136 moves the latch 134 in the latching direction to the latching position, and the latch 134, unable to move in the unlatching direction to the unlatching position, latches the tailgate 118 to the surrounding body 116 against the striker 136.

In addition, the latch 134 may be deactivated for movement in the unlatching direction. When the tailgate 118 is being opened, the latch 134 functions as the tailgate 118 is moved to the open position. With the tailgate 118 in the closed position, the latch 134, having previously latched the tailgate 118, is in the latching position. To open the tailgate 118, the latch 134 is deactivated for movement in the unlatching direction. As the tailgate 118 is moved to the open position, the striker 136 passes out of the tailgate 118 through the striker chute 132. As it passes out of the tailgate 118, the striker 136, in combination with a bias for movement in the unlatching direction, moves the latch 134 in the unlatching direction to the unlatching position, and the latch 134 unlatches the tailgate 118 from the surrounding body 116 from against the striker 136.

The vehicle 100 may include one or more latch actuators 154 for the latch assemblies 130. Each latch actuator 154 corresponds to a latch assembly 130, and may be housed, in whole or in part, in the tailgate 118. For instance, each latch actuator 154 may be housed in the tailgate 118, and connected to the tailgate 118, as a unitary module with the corresponding latch assembly 130. In one implementation, each latch actuator 154 is a motor-driven reduction drive. In this and other implementations, each latch actuator 154 is connected to the energy system. Moreover, each latch actuator 154 may be connected with the corresponding latch assembly 130. For each corresponding latch assembly 130, latch 134 and latch actuator 154, using electrical energy from the energy system 150, the latch actuator 154 is operable to activate the latch 134 for non-revertible movement in the latching direction, and deactivate the latch 134 for movement in the unlatching direction. Although the vehicle 100, as shown, includes one latch actuator 154 per latch assembly 130, it will be understood that this disclosure is applicable in principle to otherwise similar vehicles including one or more latch actuators 154 per latch assembly 130.

The vehicle 100 can include one or more processors 144. In one or more arrangements, the processor(s) 144 can be a main processor(s) of the vehicle 100. For instance, the processor(s) 144 can be an electronic control unit (ECU). The vehicle 100 can include one or more data stores 327 for storing one or more types of data. The data store(s) 327 can include volatile and/or non-volatile memory. Examples of suitable data store(s) 327 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 327 can be a component of the processor(s) 144, or the data store(s) 327 can be operably connected to the processor(s) 144 for use thereby.

The one or more data store(s) 327 can include sensor data 331. In this context, "sensor data" means any information about the sensors that the vehicle 100 is equipped with, including the capabilities and other information about such sensors. As will be explained below, the vehicle 100 can include the sensor system 142. The sensor data 331 can relate to one or more sensors of the sensor system 142. As an example, in one or more arrangements, the sensor data 331 can include information on the tailgate position sensor 379 of the sensor system 142.

The one or more data store(s) 327 can include lookup tables, equations, and other information stored so as to be accessible by sensors of the sensor system 142 and/or the tailgate control module 323 in performing the operations described herein. For example, suitable lookup tables may be used to estimate or determine a value of a motor acceleration parameter based on acquired values of a motor speed parameter or other data, as described herein.

In embodiments described herein, the memory 146 may be a random-access memory (RAM), read-only memory (ROM), a hard-disk drive, a flash memory, or other suitable memory for storing modules, such as the tailgate control module 323. The tailgate control module 323 includes, for example, computer-readable instructions that when executed by the processor 144, cause the processor(s) 144 to perform the various functions disclosed herein. Additional modules (not shown) may also be stored in memory 146. For example, as part of a central control system, the vehicle 100 may include a global control unit (GCU) to with which the tailgate control module 323 is communicatively connected.

The vehicle 100 can include one or more modules, at least some of which are described herein. The module(s) may be stored in memory 146. The modules can be implemented as computer-readable program code that, when executed by processor(s) 144, implement one or more of the various processes described herein. One or more of the modules can be a component of the processor(s) 144, or one or more of the modules can be executed on and/or distributed among other processing systems to which the processor(s) 144 is operably connected. The modules can include instructions (e.g., program logic) executable by one or more processor(s) 144. Alternatively, or in addition, one or more of data store(s) 327 or another portion of the vehicle 100 may contain such instructions.

Generally, a module, as used herein, includes routines, programs, objects, components, data structures, and so on that perform particular tasks or implement particular data types. In further aspects, a memory generally stores the modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The processors 144, the memory 146 and the tailgate control module 323 as described herein together may serve as a computing device whose control module 323 is employable to orchestrate the operation of the tailgate 118. Specifically, the tailgate control module 323 may control operation of the vehicle systems 140 based on information about the vehicle 100 (including the position and/or speed of the tailgate), received tailgate control signals, and other information. Accordingly, as a prerequisite to operating the tailgate, the control module 323 gathers and/or receives information, including the information about the vehicle 100 detected by the sensor system 142. The control module 323 may then evaluate the information and operate the various vehicle systems and elements (including the tailgate 118) based on its evaluation, with a view to controlling operations of the tailgate.

The vehicle 100 can include a tailgate control module (TGM) 323. The tailgate control module 323 may be configured to receive tailgate opening and closing commands, and to automatically control opening and closing operations of the tailgate 118. Embodiments of the tailgate control module 323 as described herein may be configured to implement an "unsupervised mode" of automatic tailgate control whereby the tailgate may be opened or remain closed depending on the magnitude of an external load determined to be acting on the tailgate when the tailgate is closed, and in cases where a user initiating the opening command may not be located where he can visually inspect the closed tailgate. If the tailgate is automatically opened under the external load, the opening speed may be monitored during opening. If the opening speed becomes excessive, the control module 323 may control operation of the tailgate actuator to apply braking forces to slow the descent of the tailgate and prevent damage to the power tailgate system.

The tailgate control module 323 may include instructions that when executed by the processor(s) 144 cause the processor(s) 144 to, either alone or in cooperation with the communications interface 383 and/or other portions of the vehicle or external to the vehicle, determine whether or not a received tailgate opening command was generated remotely. This determination may be based, for example, on an estimated origin point of a wireless command, or on a location of a human user with respect to the vehicle 100 (for example, in the cab or next to the tailgate) for a wired command.

The tailgate control module 323 may include instructions that when executed by the processor(s) 144 cause the processor(s) 144 to, responsive to a determination that a received tailgate opening command was not remotely generated, control operation of the actuator motor 210 to open the tailgate 118 at a first predetermined tailgate opening speed. The first predetermined tailgate opening speed may be a normal opening speed of the tailgate 118 in responding to a command to automatically open the tailgate, and with no external load applied to the tailgate 118. The tailgate control module 323 may be configured to assume, if the tailgate opening command is not remotely generated, that the user is able to visually inspect the cargo bed and tailgate to determine whether or not an external load is being exerted on the tailgate. In this case, the tailgate control module may default to the user's judgment regarding the viability of opening the tailgate and may open the tailgate responsive to the opening command.

The tailgate control module 323 may include instructions that when executed by the processor(s) 144 cause the processor(s) 144 to, responsive to a determination that a received tailgate opening command was remotely generated, determine if an external load is being applied to the tailgate when then tailgate is in a closed condition. The determination may be made using the external load detection sensors 371, for example. The closed condition may include the tailgate 118 being latched by the latching mechanisms previously described. The tailgate control module 323 may include instructions that when executed by the processor(s) 144 cause the processor(s) 144 to, responsive to a determination that no external load is being applied to the tailgate 118 when then tailgate is in the closed condition, control operation of the actuator motor 210 to open the tailgate at the first predetermined tailgate opening speed.

Figure 3:
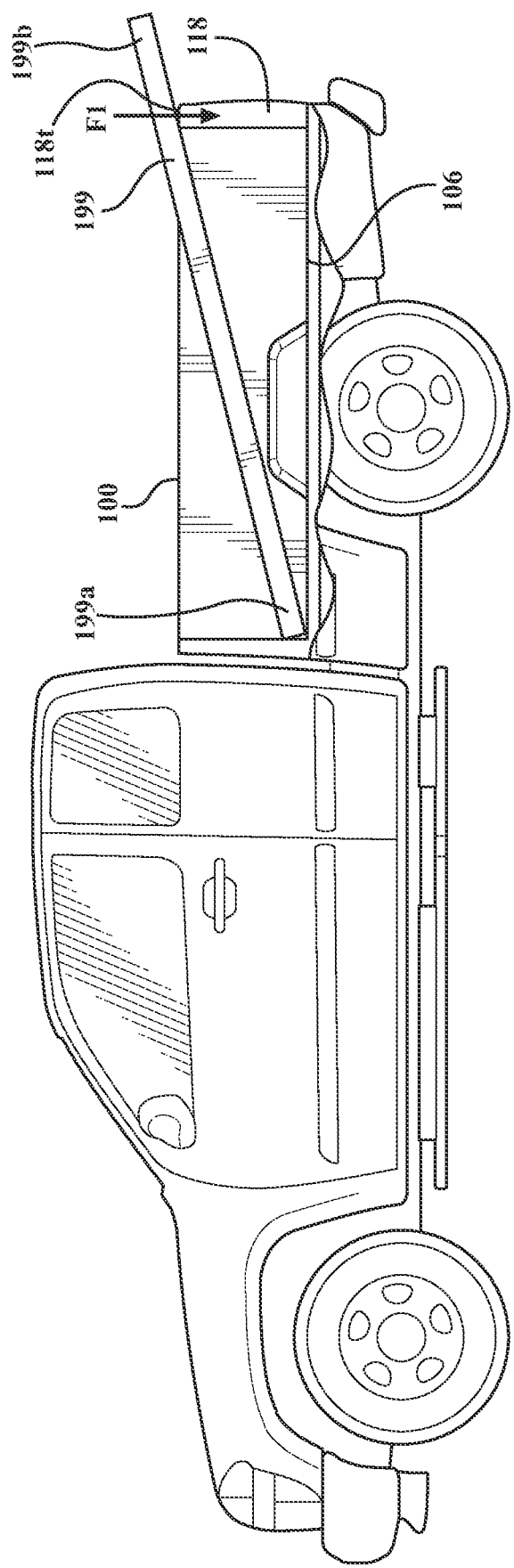
FIG. 3 is a schematic partial cross-sectional side view of the vehicle of FIG. 1B showing one possible application of a power tailgate system in accordance with an embodiment described herein.

An external load applied to a tailgate may be a load other than the forces acting on the tailgate 118 when the tailgate in the closed condition and with no object in contact with the tailgate, either in the cargo bed 106 or outside the cargo bed. Thus, for example, the only forces normally acting on the tailgate without application of an external load may be tailgate support/connection forces exerted on the tailgate by the cargo bed at the hinge assembly and along the cargo bed walls, and forces exerted by the latching assemblies and directed at maintaining the tailgate in the closed condition as described herein. For example, FIG. 3 is a schematic side view of the vehicle 100 showing one possible application of a system for controlling a vehicle power tailgate 118 as described herein. As shown in FIG. 3, one or more items of cargo 199 (such as a load of lumber or drywall) may have one end 199a resting on a floor of the cargo bed 106 and an opposite end 199b resting on the tailgate 118 and extending out past the end of the cargo bed. This cargo exerts an external load on the tailgate having a vertical force component F1. The external load detection sensors 371 may be configured to measure or estimate the value of the force F1 prior to opening the tailgate 118. The load may be a load which will continue to act on the tailgate after the latches are disengaged and the tailgate starts to descend, and which will continue to act on the tailgate throughout the opening process. If the vertical force component F1 is sufficiently high, it may cause the tailgate to open more rapidly than desired. This excessive opening speed may cause the motor to backdrive and may damage one or more elements of the tailgate system. A similar situation may occur, for example, with a load hanging over the top 118t of the tailgate and extending downwardly along a rear exterior surface of the tailgate. Such a load may tend to pull the tailgate downward at an excessive speed when the latches are disengaged and the tailgate starts to descend.

The tailgate control module 323 may include instructions that when executed by the processor(s) 144 cause the processor(s) to, responsive to a determination that an external load is being applied to the tailgate 118 when then tailgate is in the closed condition, estimate a magnitude of the external load. The tailgate control module 323 may also include instructions to, responsive to an estimated magnitude of the external load being at or above a predetermined threshold load, maintain the tailgate in a closed condition. The predetermined threshold load may be an external load at or above which the tailgate actuator may not be able to work against to close the tailgate if needed after the tailgate has started to open. The predetermined threshold load may be determined analytically and/or experimentally for a given vehicle/tailgate system design. The tailgate control module 323 may be configured to, if the estimated external load applied to the tailgate 118 before opening equals or exceeds the predetermined threshold load, disobey a received tailgate opening command and forego unlatching and opening the tailgate, so as to prevent possible damage to the tailgate.

The tailgate control module 323 may also include instructions to, responsive to an estimated magnitude of the external load being below the predetermined threshold load, control operation of the motor to start to open the tailgate at a second predetermined tailgate opening speed different from the first predetermined tailgate opening speed. The second predetermined tailgate opening speed may be an opening speed that is slower than the first predetermined tailgate opening speed (or "normal" opening speed). This second predetermined opening speed may be used when it is determined that an external load is acting on the tailgate prior to opening, and the magnitude of the load is below the predetermined threshold load. In one or more arrangements, the second predetermined opening speed may be set by a manufacturer of the vehicle or power tailgate system and may not be changed by an end-user. In other arrangements, the second predetermined opening speed may be selected from within a predetermined range by a user according to user preferences. Opening the tailgate at a relatively slower opening speed when the tailgate is under external load may aid in restricting a buildup of momentum of the tailgate, in case opening of the tailgate needs to be stopped prior to the tailgate completely opening.

The tailgate control module 323 may also include instructions to, after the motor 210 starts to open the tailgate at the second predetermined tailgate opening speed, monitor the actual tailgate opening speed during opening to determine if the actual opening speed rises to or above a predetermined threshold opening speed. The predetermined threshold opening speed may be an opening speed at or above which damage may occur to the tailgate during opening and/or at the end of opening. The actual value of the predetermined threshold opening speed may vary with particular vehicle and/or component designs and may be determined for a particular vehicle configuration analytically and/or iteratively by experimentation. For example, testing may be conducted to determine the types and/or extent of damage which may be caused by opening of the tailgate at various opening speeds caused by the loading described herein. In one or more arrangements, for purposes of triggering generation of a braking force as described herein, the predetermined threshold opening speed may be equal to or greater than the second predetermined tailgate opening speed. Thus, when it is intended to open the tailgate at the second predetermined tailgate opening speed when the tailgate is under load, a determination that the second predetermined tailgate opening speed is being exceeded may indicate that the magnitude of the load is causing backdriving of the motor 210 and a more rapid opening of the tailgate which may result in damage to the tailgate system and vehicle.

The tailgate control module 323 may also include instructions to, as long as the actual opening speed of the tailgate is not above the predetermined threshold opening speed, continue to open the tailgate at the second predetermined tailgate opening speed. If the actual opening speed of the tailgate when under actuator motor power exceeds the predetermined threshold opening speed, it may be assumed that the resultant force acting on the tailgate is producing an acceleration on the tailgate that will cause an excessive terminal speed (i.e., a final opening speed of the tailgate when the tailgate reaches the completely open position). This excessive terminal speed may cause damage to the tailgate system and vehicle.

The tailgate control module 323 may also include instructions to, if the actual opening speed rises to or above the predetermined threshold opening speed, determine if a value of a motor speed parameter is at or above a predetermined motor speed threshold and a value of a motor acceleration parameter is at or above a predetermined motor acceleration threshold. The predetermined motor speed threshold and the predetermined motor acceleration threshold may represent critical values of motor-related parameters (such as rotation speed of the rotor and rotor acceleration/deceleration, for example) which are associated with the actual opening speed of the tailgate being at or above the predetermined threshold opening speed. Thus, the critical values of these parameters may reflect operating conditions of the tailgate system under which the risk of damage to elements of the tailgate system and/or vehicle components is greatly increased. The critical values of the predetermined motor speed threshold and the predetermined motor acceleration threshold may take into consideration operating conditions of the motor itself, and may reflect thresholds at or above which damage-free operation of the motor may be jeopardized.

Figure 4A:
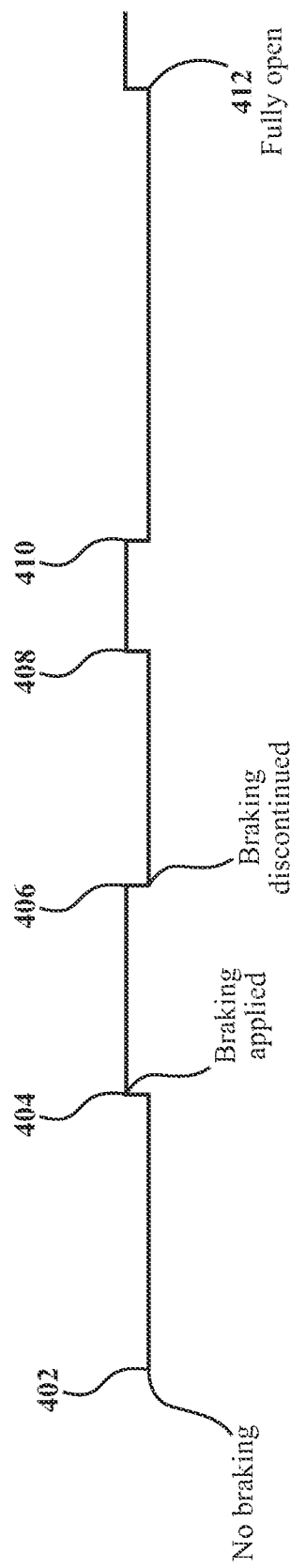
FIG. 4A is a schematic diagram showing one example of application of a braking force to a tailgate.
Figure 4B:
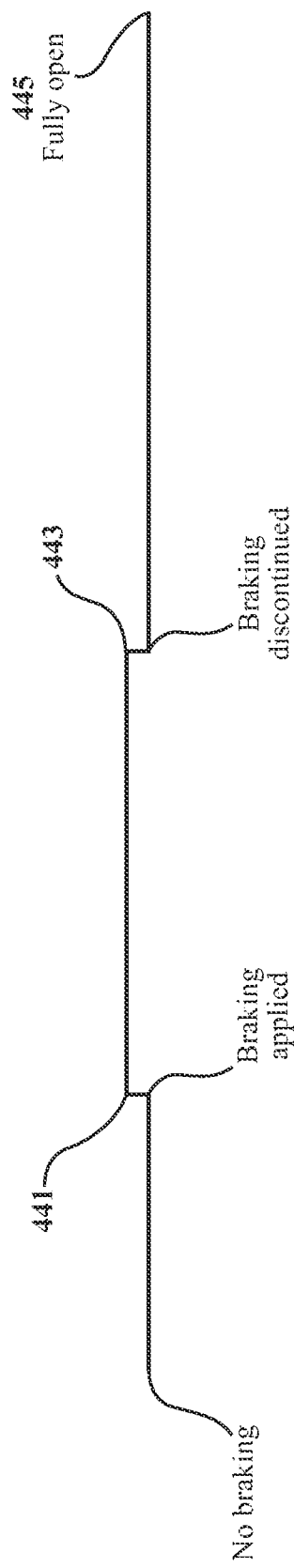
FIG. 4B is a schematic diagram showing another example of application of a braking force to a tailgate.
Figure 4C:
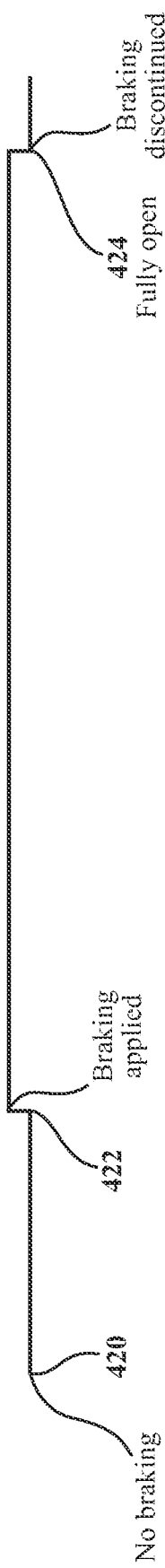
FIG. 4C is a schematic diagram showing yet another example of application of a braking force to a tailgate.

The speed and acceleration of pertinent portions of the motor may be compared with these motor threshold values after the tailgate begins to open. If the values of the motor speed parameter and the motor acceleration parameter rise above the predetermined motor speed threshold and the predetermined motor acceleration threshold, respectively, the system may determine that the magnitude of the external load is such that a braking force must be applied to the tailgate to slow its descent, in order to prevent damage to the tailgate system and vehicle. The tailgate control module may then control operation of the motor to apply a braking force to the tailgate. Control of the motor to generate a braking force may include intermittently or continuously controlling the motor so as to tend to stop rotation of the motor. As seen in FIGS. 4A-4C, the braking may be applied in a binary "on" or "off" manner.

Critical values of the parameters to be used for decision-making may be determined analytically and/or iteratively through experimentation. For example, values of the predetermined motor speed threshold and the predetermined motor acceleration threshold to be used for a particular application may be determined by the vehicle manufacturer, and may depend on actuator motor characteristics, capabilities of the Hall-effect sensor (or other sensor) used to determine motor rotation parameter values, the desired predetermined threshold opening speed for a given vehicle design, and a variety of other pertinent factors.

In a particular arrangement, the value of the predetermined motor speed threshold may be 350 m/sec. The current motor speed parameter value may be determined from rotor RPM using Hall sensor data, for example.

Application of the braking force has the effect of temporarily arresting or slowing the opening of the tailgate, thereby interrupting what may otherwise be a continued acceleration of the tailgate during opening. This is done with the intent of reducing the actual tailgate opening speed to value below the predetermined threshold opening speed, which may also bring the motor speed parameter and the motor acceleration parameter to values below the predetermined motor speed threshold and the predetermined motor acceleration threshold, thereby reducing the possibility of damage. For example, if the tailgate is allowed to accelerate continuously under the force of its own weight and the added weight of an external load, the acceleration and terminal opening speed may reach levels where the one or more elements of the tailgate system may be damaged at the end of opening. After the actuator motor parameter values have been reduced by tailgate braking, the braking force may be removed and the tailgate may be allowed to proceed with opening.

FIG. 4A is a schematic diagram showing one example of application of a braking force to a tailgate. The drawing shows the intermittent application of braking force during the period that the tailgate is opening. At point 402, the motor 210 may control the tailgate to start to open the tailgate. At point 404, the control module 323 may determine that the actual tailgate opening speed has risen to a level at or above the predetermined threshold opening speed. The system may then determine if the current motor speed parameter value is at or above the predetermined motor speed threshold and also if the current motor acceleration parameter value is at or above the predetermined motor acceleration threshold. If the current motor speed parameter value is at or above the predetermined motor speed threshold and the current motor acceleration parameter value is at or above the predetermined motor acceleration threshold, the motor 210 may be controlled to generate a braking force to be applied to the tailgate (i.e., the braking force may switch to an "on" condition and remain "on" "until it is determined that the current motor speed parameter value is below the predetermined motor speed threshold and the current motor acceleration parameter value is below the predetermined motor acceleration threshold).

FIG. 4A shows the application of a braking force as needed to slow the opening speed of the tailgate whenever the current motor speed parameter value is above the predetermined motor speed threshold and the current motor acceleration parameter value is above the predetermined motor acceleration threshold due to slowing of the tailgate descent (for example, at point 406 of FIG. 4A). The motor may then be controlled (for example, at point 406) to discontinue the braking force and the tailgate may continue to open unbraked until another rise in motor parameter values.

Referring again to FIG. 4A, as the tailgate once again builds up opening speed, if the current motor speed parameter value is at or above the predetermined motor speed threshold and the current motor acceleration parameter value is at or above the predetermined motor acceleration threshold, another braking force may be applied to the tailgate (at point 408). This force may be maintained until (at point 410) the current motor speed parameter value is below the predetermined motor speed threshold and the current motor acceleration parameter value is below the predetermined motor acceleration threshold, at which point the braking may be discontinued. This cycle may be repeated as needed to maintain the opening speed below a certain level until the tailgate reaches the completely open position (at point 412). The motor speed parameter value and the motor acceleration parameter value may be monitored continuously throughout the tailgate opening process and compared with the applicable thresholds.

FIG. 4B is a schematic diagram showing another example of application of a braking force to a tailgate. In this case, as in FIG. 4A, the braking force may be applied (at point 441) when it is determined that the current motor speed parameter value is at or above the predetermined motor speed threshold and the current motor acceleration parameter value is at or above the predetermined motor acceleration threshold. In this case, the braking force must be applied for a relatively longer time period in order to reduce the current motor speed parameter value to a value below the predetermined motor speed threshold and the current motor acceleration parameter value to a value below the predetermined motor acceleration threshold. Application of the braking force may then be discontinued at point 443, and the tailgate opening speed may not again rise to the previous "pre-braking" level before the tailgate reaches the fully open condition (at point 445).

FIG. 4C is a schematic diagram showing yet another example of application of a braking force to a tailgate. In this situation, the control module 323 may control operation of the motor to apply a braking force continuously to the tailgate. Such braking may be used, for example, in cases where the load acting on the tailgate is so large that a relatively short-term application of the braking force fails to reduce the current motor speed parameter value to a value below the predetermined motor speed threshold and the current motor acceleration parameter value to a value below the predetermined motor acceleration threshold. Continuous application of the braking force has the effect of slowing the descent of the tailgate to the greatest degree possible with the existing actuator(s) and during the entire time the tailgate is opening, in order to prevent damage to the tailgate system and vehicle.

For example, at point 420, the motor 210 may control the tailgate 118 to start to open the tailgate. At point 422, the control module 323 may determine that is tailgate opening speed is above the predetermined threshold opening speed. The system may then determine if the motor speed parameter value is at or above the predetermined motor speed threshold and also if the motor acceleration parameter value is at or above the predetermined motor acceleration threshold. If the motor speed parameter value is at or above the predetermined motor speed threshold and the motor acceleration parameter value is at or above the predetermined motor acceleration threshold, the tailgate control module 323 may apply a braking force at point 422. However, since application of the braking force fails to sufficiently reduce the values of the motor speed parameter value and the motor acceleration parameter, the braking force may be maintained until the tailgate is fully open (point 424) to reduce the tailgate opening speed as much as possible.

The tailgate control module 323 may include instructions that when executed by the processor(s) cause the processor (s) to control operation of the motor 210 so as to tend to stop a rotation of the motor, to generate the braking force. A direction of rotation of the motor 210 may be a direction of rotation of a rotor or an output shaft of the motor, for example, or a direction of rotation of any element of the motor which is operably coupled to the tailgate for opening/lowering and closing/raising the tailgate. For example, the motor 210 may be structured and operably connected to the tailgate 118 (by actuator and hinge assembly components as described herein) so that a rotation of the motor in a first direction may open the tailgate, while rotation of the motor in a second direction opposite the first direction may close the tailgate.

Figure 5:
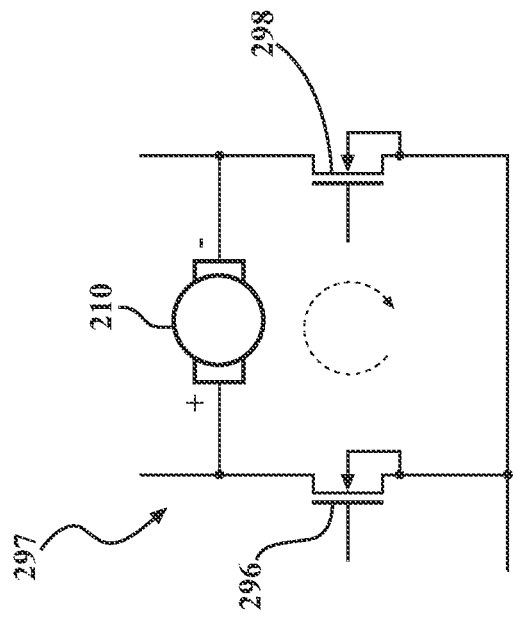
FIG. 5 is a schematic view of one embodiment of a portion of a motor circuit used to apply a short circuit to the motor.

In one or more arrangements, a circuit of the motor 210 may be operable to apply a short circuit across the motor 210. Through application of a short circuit, the motor circuit 203 is operable to electrically brake the motor 210, whereupon the motor 210 resists being mechanically driven for spinning action (i.e., rotor rotation is impeded). This may have the effect of braking the tailgate as the motor is back-driven by opening at a speed greater than the predetermined threshold opening speed. In one particular method of applying a short circuit to the motor, an H-bridge circuit 297 with a pair of field effect transistors (FET's) 296 and 298 may be used as shown in FIG. 5. As is known, an H-bridge circuit may be employed to switch the polarity of a voltage applied to a load. Other methods of applying a short-circuit to the motor may also be used.

The processor(s) 144, the tailgate control module 323, and the memory 146 can be operably connected to communicate with each other and with the other elements of the vehicle, including various vehicle systems 140 and/or individual components thereof.

Referring again to FIG. 1, a sensor fusion algorithm 325 may be an algorithm (or a computing device storing an algorithm) configured to accept data from the sensor system 142 as an input. The data may include, for example, data representing information sensed at the sensors of the sensor system 142. The sensor fusion algorithm 325 may include or be configured to be executed using, for instance, a Kalman filter, Bayesian network, or other algorithm. The sensor fusion algorithm 325 may provide various assessments based on the data from sensor system 142. Depending upon the embodiment, the assessments may include evaluations of evaluations of particular situations and/or evaluations of possible impacts based on the particular situation. Other assessments are possible. For example, the sensor fusion algorithm 325 may evaluate information from the vehicle sensors, vehicle systems and other information from outside the vehicle (such as GPS information) to determine whether a received tailgate opening command is remotely generated or locally generated.

As noted above, the vehicle 100 can include the sensor system 142. The sensor system 142 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. The sensor system 142 is operable to detect information about the vehicle 100. In arrangements in which the sensor system 142 includes a plurality of sensors, the sensors can work independently from each other. Alternatively, two or more of the sensors can work in combination with each other. In such case, the two or more sensors can form a sensor network. The sensor system 142 and/or the one or more sensors can be operably connected to the processor(s) 144, the data store(s) 327, and/or other element(s) of the vehicle 100 (including any of the elements shown in FIG. 1).

The sensor system 142 can include any suitable type of sensor. Various examples of different types of sensors will be described herein. However, it will be understood that the embodiments are not limited to the particular sensors described. Various examples of sensors of the sensor system 142 are described herein. However, it will be understood that the embodiments are not limited to the particular sensors described. The sensor system 142 may include any sensors suitable for and/or required to perform any of the data acquisition and/or vehicle control operations contemplated herein.

Sensors of sensor system 142 may be communicably coupled to the various systems and components of the vehicle 100. The sensors may be operably connected to the vehicle wireless communications interface 383 for transmission of information to a cloud or other storage facility or for vehicle-to-vehicle (V2V) or vehicle-to-everything (V2X) communications. The sensors may also be operably connected to other vehicle systems and components, such as data stores 327 and processor(s) 144, for controlling the tailgate 118 and other portions of the vehicle 100. The existence of any predetermined conditions described herein may be calculated or otherwise determined using sensor data.

Along with the sensors shown in FIG. 1, the vehicle 100 may include one or more additional tailgate-related sensors such as latch sensors (not shown), tailgate orientation or position sensors, and other sensors required for the performance of the vehicle control operations described herein. Relatedly, the sensor system 142 may be operable to detect, for example, the movement of the tailgate 118, the operation of the latches 134, requests to automatically open the tailgate 118, requests to automatically close the tailgate 118, and the operational statuses of one, some or all of the vehicle systems 140, including the energy system 150, the tailgate actuator 122 and the latch actuators 154, and the values of tailgate-related parameters and the existence and non-existence of various predetermined conditions.

In one or more arrangements, the sensor system 142 may include one or more motor parameter sensors operably connected to the actuator motor 210 and configured to detect or determine values of various motor-related operational parameters. In one or more arrangements, the motor parameter sensors may include a motor speed sensor 373 configured to detect or determine a speed of the motor 210. A speed of the motor may be a rotational speed of a rotor of the motor, or the speed of any element of the motor which is operably coupled to the tailgate for opening/lowering and closing/raising the tailgate. Thus, the speed of the motor may be directly related to the tailgate opening speed. The motor parameter sensors may also include a motor acceleration sensor 369 configured to detect or determine an acceleration of the motor 210. More particularly, the motor acceleration sensor 369 may be configured to detect rates of change in motor speed during opening of the tailgate. Alternatively, the tailgate control module 323 may be configured to calculate or otherwise determine an acceleration of the motor based on changes in motor speed over time and using formulae, lookup tables, and/or other information which may be stored in memory 146.

The sensor system 142 may include a tailgate opening speed sensor 377 (for example, a suitably configured Hall Effect sensor) configured to detect or determine the opening speed the tailgate. The sensor system 142 may include one or more external load detection sensors 371. The external load detection sensors 371 may be configured for detecting and/or determining a magnitude and direction of any external load acting on the tailgate 118. Based on an estimated direction and magnitude of an external load applied to the tailgate before opening, a decision may be made not to unlatch and open the tailgate, so as to prevent possible damage to the tailgate.

The sensor system 142 may include one or more tailgate position sensors 379 configured to detect an opening status of the tailgate (i.e., whether the tailgate is closed, latched, partially open, fully open, etc.) and/or a rotational orientation or position of the tailgate (i.e., the degree to which the tailgate is open or closed at any given point in time).

If needed, the sensor system 142 may include one or more tailgate opening signal detection sensor(s) 375 in communication with the wireless communications interface 383 and configured to aid in determining or estimating the location of the received wireless tailgate opening command.

The vehicle 100 can include one or more vehicle systems, collectively designated 140. Various examples of the one or more vehicle systems 140 are shown in FIG. 1A. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100.

The vehicle systems 140 may be operable to perform vehicle functions. On behalf of the vehicle system 140 to which it belongs, each vehicle element is operable to perform, in whole or in part, any combination of vehicle functions with which the vehicle system 140 is associated. The vehicle systems 140 may be communicatively connected with the memory 146, the tailgate actuator(s) 122, processor(s) 144, and any other elements and systems of the vehicle 100 as needed to perform the tailgate control functions described herein.

The tailgate 118, latch assemblies 130, actuator(s) 122, control module 323, and any sensors providing information relating to tailgate operations may collectively define a power tailgate system of the vehicle 100. In addition, the vehicle systems 140 may include an energy system 150. Elements of the power tailgate system may be connected to the energy system 150. The energy system 150 may be operable to perform one or more energy functions, including but not limited to storing and otherwise handling electrical energy. Elements of the power tailgate system may be operable to perform one or more tailgate control functions using electrical energy from the energy system 150, including but not limited to automatically opening the tailgate 118 and automatically closing the tailgate 118.

The vehicle 100 can include an input system 156. An "input system" includes any device, component, system, element or arrangement or groups thereof that enable information/data to be entered into a machine. For example, the input system 156 may include a keypad, a touch screen or other interactive display, a voice-recognition system and/or any other device or system which facilitates communications between a user and the vehicle. The input system 156 can receive wireless input from a vehicle occupant (e.g., a driver or a passenger) or a user located remotely from the vehicle 100. For example, the input system may enable a user to input tailgate control commands to the tailgate control module.

The vehicle 100 can also include an output system 158. An "output system" includes any device, component, or arrangement or groups thereof that enable information/data to be presented to a vehicle occupant (e.g., a driver, a vehicle passenger, etc.) or a remote user. For example, the output system may be operable to issue tactile, sound and visual outputs that may be sensed by users. The output system may enable a user to receive alerts or other information relating to the position, speed, and other operating parameters of the tailgate.

The vehicle wireless communications interface 383 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 383 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. User-initiated commands such as wireless tailgate opening commands may be received and other types of information may be transmitted and received via the communications interface 383. If required, wireless communications interface 383 may incorporate or be in communication with any network interfaces needed to communicate with any extra-vehicular entities and/or networks.

In one or more arrangements, the wireless communications interface 383 may be configured to determine or estimate a location of origin of a received wireless tailgate opening command. This information may aid the tailgate control module in determining the location of a user with respect to the vehicle, and thus whether the received tailgate opening command is locally generated or remotely generated. A tailgate opening command is a user-initiated command to open the tailgate. The tailgate opening command may be locally generated or remotely generated.

A locally generated tailgate opening command may be a command generated within a predetermined distance from the tailgate and/or from a position within a predetermined range of positions with respect to the tailgate. These distances from the tailgate and positions with respect to the tailgate may be determined or estimated so as to enable an assumption that the tailgate and the contents of the cargo bed are visible to a human user prior to the user generating a tailgate opening command, if the command is determined to be received from any of the predetermined distances and/or positions. The tailgate control module 323 may be configured to assume that, if a tailgate opening command is received from any of the predetermined distances and/or positions, the user can see what is in the cargo bed and any object that may be exerting an external load on the tailgate. Under these conditions, if the user still decides to open the tailgate even when an external load is acting on the tailgate, the tailgate control module may permit the tailgate to be opened at a first predetermined tailgate opening speed (or "normal" opening speed) responsive to the locally generated tailgate opening command. Locally generated opening commands may come from, for example, a keyfob (wireless) when the user is determined to reside in a location where he can see the cargo bed and its contents, or the pressing of a button located near the tailgate (wired).

A remotely generated tailgate opening command may be an opening command generated from a distance or a position with respect to the tailgate that is considered outside the ranges and/or positions prescribed for locally generated commands. One example may be an opening command generated from the vehicle occupant compartment. A user generating an opening command from the occupant compartment or cab may not be able to see the cargo bed contents and an external load acting on the tailgate, and thus may not be aware of damage that may be caused by opening the tailgate when under external loading. Thus, if a remotely generated opening command is received, the control module may determine if an external load is being applied to the tailgate.

If no external load is being applied to the tailgate, the tailgate control module may control operation of the motor to open the tailgate at the normal opening speed responsive to the remotely generated opening command. However, if an external load is being applied to the tailgate, the tailgate control module may determine the magnitude of the load and control operation of the motor as described herein to implement various automatic control operations directed to preventing damage to the tailgate due to the external loading. Remotely generated opening commands may come from, for example, a keyfob (wireless) when the user is determined to not to reside in a location where he can see the cargo bed and its contents, or the pressing of a button in the vehicle cab (wired) in a situation where the user may not be able to see the cargo bed and its contents.

Figure 6:
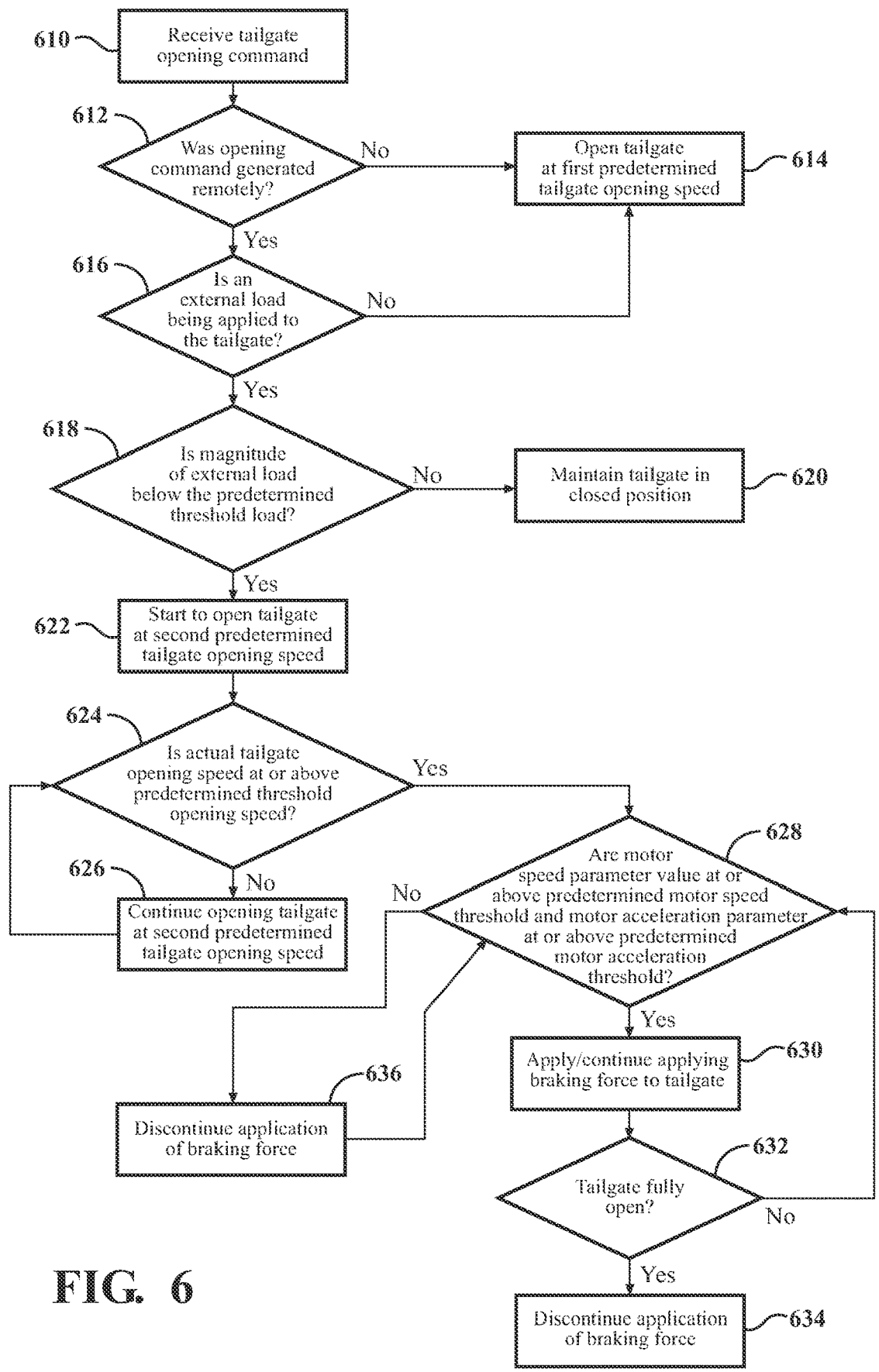
FIG. 6 is a flow diagram illustrating operation of a system for controlling a vehicle power tailgate in accordance with an embodiment described herein.

FIG. 6 is a flow diagram illustrating operation of a system for controlling a vehicle power tailgate in accordance with an embodiment described herein.

In block 610, the tailgate control module 323 may receive a tailgate opening command. In block 612, the tailgate control module 323 may determine if the received tailgate opening command was remotely generated. If the received opening command was not remotely generated, the tailgate control module 323 may (in block 614) control operation of the actuator motor 210 to open the tailgate 118 at the first predetermined tailgate opening speed. However, if the received opening command was not remotely generated, the tailgate control module 323 may (in block 616) determine if an external load is being applied to a tailgate when then tailgate is in the closed condition.

The tailgate control module 323 may (in block 614), if it is determined in block 616 that no external load is being applied to the tailgate when then tailgate is in the closed condition, control operation of the motor to open the tailgate at the first predetermined tailgate opening speed. However, if it is determined in block 616 that an external load is being applied to the tailgate when then tailgate is in the closed condition, the tailgate control module 323 may (in block 618) estimate a magnitude of the external load and compare the estimated magnitude of the load to the predetermined threshold load. If the estimated magnitude of the external load is at or above the predetermined threshold load, the tailgate control module 323 may (in block 620) maintain the tailgate in the closed condition in disobedience of the opening command. However, if the estimated magnitude of the external load is below the predetermined threshold load, the tailgate control module 323 may (in block 622) control operation of the motor to start to open the tailgate at the second predetermined tailgate opening speed.

After controlling the motor 210 to start to open the tailgate 118 at the second predetermined tailgate opening speed, the tailgate control module 323 may (in block 624) continuously monitor the actual tailgate opening speed to determine if the actual opening speed rises above the predetermined threshold opening speed. As long as the actual opening speed does not rise above the predetermined threshold opening speed, the tailgate control module 323 may (in block 626) control operation of the motor to continue to open the tailgate at the second predetermined tailgate opening speed. However, if the actual opening speed rises above the predetermined threshold opening speed, the tailgate control module 323 may (in block 628) determine if the value of the motor speed parameter is at or above the predetermined motor speed threshold and the value of the motor acceleration parameter is at or above the predetermined motor acceleration threshold.

If the value of the motor speed parameter is at or above the predetermined motor speed threshold and the value of the motor acceleration parameter is at or above the predetermined motor acceleration threshold, the tailgate control module 323 may (in block 630) control operation of the motor 210 to apply a braking force to the tailgate, in a manner previously described. If a braking force is not being applied to the tailgate when it is determined that the value of the motor speed parameter is at or above the predetermined motor speed threshold and the value of the motor acceleration parameter is at or above the predetermined motor acceleration threshold, the motor may be controlled to initiate application of a braking force. If a braking force is being applied to the tailgate and it is determined that the value of the motor speed parameter is still at or above the predetermined motor speed threshold and the value of the motor acceleration parameter is still at or above the predetermined motor acceleration threshold, the motor may be controlled to continue application of the braking force.

In block 632, the tailgate control module 323 may (using data from tailgate position sensor(s) 379) determine if the tailgate is fully open. If the tailgate is fully open, there is no further need for the braking force and tailgate control module 323 may (in block 634) control operation of the motor to discontinue application of the braking force to the tailgate. However, if the tailgate is not fully open, control may loop back to block 628, where it may be determined if the value of the motor speed parameter is still at or above the predetermined motor speed threshold and the value of the motor acceleration parameter is still at or above the predetermined motor acceleration threshold.

If the value of the motor speed parameter is still at or above the predetermined motor speed threshold and the value of the motor acceleration parameter is still at or above the predetermined motor acceleration threshold, blocks 630-632 may be repeated. However, if it is determined that the value of the motor speed parameter is below the predetermined motor speed threshold and the value of the motor acceleration parameter is below the predetermined motor acceleration threshold, tailgate control module 323 may (in block 636) control operation of the motor to discontinue application of the braking force to the tailgate.

In the manner just described, the motor 210 may be controlled to apply a braking force to the tailgate whenever the value of the motor speed parameter is at or above the predetermined motor speed threshold and the value of the motor acceleration parameter is at or above the predetermined motor acceleration threshold, and to discontinue application of the braking force when the value of the motor speed parameter is below the predetermined motor speed threshold and the value of the motor acceleration parameter is below the predetermined motor acceleration threshold.

Values of the actual tailgate opening speed (for comparison to the predetermined threshold opening speed) and associated values of the actuator motor speed and acceleration parameters (for comparison with the predetermined motor speed threshold and the predetermined motor acceleration threshold) may be continuously determined and updated during descent of the tailgate to the fully open position.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling a vehicle power tailgate comprising:
   a motor operably connectible to a tailgate to open and close the tailgate;
   a processor; and
   a memory communicably coupled to the processor and storing a tailgate control module including instructions that when executed by the processor cause the processor to, responsive to a value of a motor speed parameter being at or above a predetermined motor speed threshold and a value of a motor acceleration parameter being at or above a predetermined motor acceleration threshold during opening of a tailgate, control operation of the motor to apply a braking force to the tailgate.

2. The system of claim 1 wherein the tailgate control module includes instructions that when executed by the processor cause the processor to control operation of the motor to apply the braking force until the value of the motor speed parameter is no longer at or above the predetermined motor speed threshold and the value of the motor acceleration parameter is no longer at or above the predetermined motor acceleration threshold.

3. The system of claim 1 wherein the tailgate control module includes instructions that when executed by the processor cause the processor to control operation of the motor so as to tend to stop a rotation of a rotor of the motor to generate the braking force.

4. The system of claim 3 wherein the tailgate control module includes instructions that when executed by the processor cause the processor to control operation of the motor to generate the braking force by applying a short circuit to the motor so as to impede rotation of the rotor.

5. The system of claim 1 wherein the tailgate control module includes instructions that when executed by the processor cause the processor to, responsive to a determination that a received tailgate opening command was not remotely generated, control operation of the motor to open the tailgate at a first predetermined tailgate opening speed.

6. The system of claim 1 wherein the tailgate control module includes instructions that when executed by the processor cause the processor to:
    responsive to a determination that a received tailgate opening command was remotely generated, determine if an external load is being applied to a tailgate when then tailgate is in a closed condition; and
    responsive to a determination that no external load is being applied to the tailgate when the tailgate is in the closed condition, control operation of the motor to open the tailgate at a first predetermined tailgate opening speed.

7. The system of claim 6 wherein the tailgate control module includes instructions that when executed by the processor cause the processor to:
    responsive to a determination that an external load is being applied to the tailgate when the tailgate is in the closed condition, estimate a magnitude of the external load; and
    responsive to an estimated magnitude of the external load being at or above a predetermined threshold load, maintain the tailgate in the closed condition.

8. The system of claim 6 wherein the tailgate control module includes instructions that when executed by the processor cause the processor to:
    responsive to a determination that an external load is being applied to the tailgate when the tailgate is in the closed condition, estimate a magnitude of the external load; and
    responsive to an estimated magnitude of the external load being below a predetermined threshold load, control operation of the motor to start to open the tailgate at a second predetermined tailgate opening speed different from the first predetermined tailgate opening speed.

9. The system of claim 8 wherein the tailgate control module includes instructions that when executed by the processor cause the processor to:
    determine an actual opening speed of the tailgate;
    if the actual opening speed is at or above a predetermined threshold opening speed, determine if the value of the motor speed parameter is at or above the predetermined motor speed threshold and if the value of the motor acceleration parameter is at or above the predetermined motor acceleration threshold; and
    if the actual opening speed is less than the predetermined threshold opening speed, continue controlling operation of the motor to open the tailgate at the second predetermined tailgate opening speed.

10. A method of controlling a vehicle power tailgate system including a motor operably connectible to a tailgate to open and close the tailgate, the method comprising steps of:
    responsive to a value of a motor speed parameter being at or above a predetermined motor speed threshold and a value of a motor acceleration parameter being at or above a predetermined motor acceleration threshold during opening of a tailgate, controlling operation of the motor to apply a braking force to the tailgate; and
    responsive to the value of the motor speed parameter being below the predetermined motor speed threshold and the value of the motor acceleration parameter being below the predetermined motor acceleration threshold during opening of a tailgate, controlling operation of the motor to discontinue application of a braking force to the tailgate.

11. The method of claim 10 wherein the step of controlling operation of the motor to apply the braking force to the tailgate comprises controlling operation of the motor so as to tend to stop a rotation of a rotor of the motor.

12. The method of claim 11 wherein the step of controlling operation of the motor to apply the braking force to the tailgate comprises controlling operation of the motor to generate the braking force by applying a short circuit to the motor so as to impede rotation of the rotor.

13. The method of claim 10 further comprising a step of responsive to a determination that a received tailgate opening command was not remotely generated, controlling operation of the motor to open the tailgate at a first predetermined tailgate opening speed.

14. The method of claim 10 further comprising steps of:
    responsive to a determination that a received tailgate opening command was remotely generated, determining if an external load is being applied to a tailgate when then tailgate is in a closed condition; and
    responsive to a determination that no external load is being applied to the tailgate when the tailgate is in the closed condition, controlling operation of the motor to open the tailgate at a first predetermined tailgate opening speed.

15. The method of claim 14 further comprising steps of:
    responsive to a determination that an external load is being applied to the tailgate when the tailgate is in the closed condition, estimating a magnitude of the external load; and
    responsive to an estimated magnitude of the external load being above a predetermined threshold load, maintaining the tailgate in the closed condition.

16. The method of claim 14 further comprising steps of:
    responsive to a determination that an external load is being applied to the tailgate when the tailgate is in the closed condition, estimating a magnitude of the external load; and
    responsive to an estimated magnitude of the external load being at or below a predetermined threshold load, controlling operation of the motor to start to open the tailgate at a second predetermined tailgate opening speed different from the first predetermined tailgate opening speed.

17. The method of claim 16 further comprising steps of:
    determining an actual opening speed of the tailgate;
    if the actual opening speed is greater than a predetermined threshold opening speed, determining if the value of the motor speed parameter is above the predetermined motor speed threshold and if the value of the motor acceleration parameter is above the predetermined motor acceleration threshold; and
    if the actual opening speed is less than or equal to the predetermined threshold opening speed, continuing to control operation of the motor to open the tailgate at the second predetermined tailgate opening speed.

18. A non-transitory computer-readable medium for controlling a vehicle power tailgate system including a motor operably connectible to a tailgate to open and close the tailgate, the medium storing instructions that when executed by one or more processors cause the one or more processors to:

responsive to a value of a motor speed parameter being at or above a predetermined motor speed threshold and a value of a motor acceleration parameter being at or above a predetermined motor acceleration threshold during opening of a tailgate, controlling operation of the motor to apply a braking force to the tailgate; and responsive to the value of the motor speed parameter being below the predetermined motor speed threshold and the value of the motor acceleration parameter being below the predetermined motor acceleration threshold during opening of a tailgate, controlling operation of the motor to discontinue application of a braking force to the tailgate.

19. The non-transitory computer-readable medium of claim 18, wherein the instructions further include instructions to control operation of the motor to generate the braking force by applying a short circuit to the motor so as to impede rotation of a rotor of the motor.

\* \* \* \* \*